US006801586B1

(12) United States Patent
Imamura

(10) Patent No.: US 6,801,586 B1
(45) Date of Patent: Oct. 5, 2004

(54) OFDM COMMUNICATION APPARATUS AND PROPAGATION PATH ESTIMATION METHOD

(75) Inventor: Daichi Imamura, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 701 days.

(21) Appl. No.: 09/651,094

(22) Filed: Aug. 30, 2000

(30) Foreign Application Priority Data

Aug. 31, 1999 (JP) .......................................... H11-245098

(51) Int. Cl.$^7$ .............................. H03D 1/00; H04J 11/00
(52) U.S. Cl. ........................ 375/340; 375/341; 370/208
(58) Field of Search ................................ 375/285, 284, 375/316, 346, 348, 152, 150, 142, 145, 325, 350, 340, 341; 370/208, 210

(56) References Cited

U.S. PATENT DOCUMENTS

| | | | | |
|---|---|---|---|---|
| 5,799,047 A | * | 8/1998 | Dobrica ....................... | 375/350 |
| 6,081,549 A | * | 6/2000 | Shou et al. .................. | 375/152 |
| 6,519,296 B1 | * | 2/2003 | Hladik ........................ | 375/325 |

FOREIGN PATENT DOCUMENTS

| GB | WO 98/37649 | * | 8/1998 |
|---|---|---|---|
| JP | 08265184 | | 11/1996 |

OTHER PUBLICATIONS

S. Hara; "Transmission Performance Analysis of Multi–Carrier Modulation in Frequency Selective Fast Rayleigh Fading Channel"; Wireless Personal Communications 2: 335–356, 1996.

V. Mignone, et al.: "CD3–OFDM: A New Channel Estimation Method To Improve The Spectrum Efficiency In Digital Terrestrial Television Systems", International Broadcasting Convention 1995, No. 413, Sep. 14, 1995, pp. 122–128, XP000617513, *abstract*.

M. Bossert, et al.: "Improved Channel Estimation With Decision Feedback For OFDM Systems", Electronics Letters, IEE Stevenage, GB, vol. 34, No. 11, May 28, 1998, pp. 1064–1065, XP000846188, ISSN: 0013–5194.

L. Jarbot: "Combined Decoding And Channel Estimation Of OFDM Systems In Mobile Radio Networks", 1994 IEEE 47th. Vehicular Technology Conference. Phoenix, May 4–7, 1997, IEEE Vehicular Technology Conference, New York, IEEE, US, vol. 3 Conf. 47, May 4, 1997, pp. 1601–1064, XP000738633, ISBN: 0–7803–3660–7.

(List continued on next page.)

Primary Examiner—Young T. Tse
Assistant Examiner—Sam K. Ahn
(74) Attorney, Agent, or Firm—Stevens, Davis, Miller & Mosher, LLP

(57) ABSTRACT

An OFDM communication apparatus may include a receiver that receives an OFDM signal in which a known signal and an information signal, following the known signal, are superimposed upon a plurality of subcarriers. A calculator of this apparatus calculates a propagation path estimated value using: (i) the known signal and the received version of the known signal or (ii) the received information signal and a recoded signal. A propagation path distortion compensator compensates the propagation path distortion of the received information signal, using the propagation path estimated value, to produce a distortion compensated signal. An error corrector error corrects the distortion compensated signal to produce an error corrected signal, and a recoder recodes the error corrected signal to produce the recoded signal. The calculator further calculates a correction value for updating the propagation path estimated value using the recoded signal and the received information signal.

8 Claims, 16 Drawing Sheets

OTHER PUBLICATIONS

J. Rinne, et al.: "Equalization Of Orthogonal Frequency Division Multiplexing Signals", Proceedings of the Global Telecommunications Conference (Globecom). San Francisco, Nov. 28–Dec. 2, 1994, New York, IEEE, US, vol. 1, Nov. 28, 1994, pp. 415–419, XP000488584, ISBN: 0–7803–1821–8, *abstract*.

Chinese Office Action dated Oct. 31, 2003 with English translation.

* cited by examiner

OFDM COMMUNICATION APPARATUS AND PROPAGATION PATH ESTIMATION METHOD

BACKGROUND OF THE INVENTION

1. Field of the Invention

The present invention relates to an OFDM communication apparatus and propagation path estimation method in a digital radio communication system.

2. Description of the Related Art

A leading cause of deterioration of a transmission characteristic in a current ground wave transmission path is multi-path interference. An OFDM (Orthogonal Frequency Division Multiplexing) transmission system, which is resistant to this multi-path interference, is receiving attention in recent years. This OFDM is a system that multiplexes a multiple (several tens to several hundreds) of mutually orthogonal digital modulated signals in a certain signal segment.

A conventional OFDM communication apparatus calculates a frequency response estimated value of the propagation path by performing time-frequency conversion on a reception signal through an FFT circuit and performing a complex multiplication on a pilot symbol and known signal contained in the reception signal. Then, by carrying out a complex multiplication on the frequency response estimated value and information OFDM symbol, the conventional OFDM communication apparatus compensates propagation path distortion. This reception signal with propagation path distortion compensated is demodulated and subjected to error correction by an error detection circuit and in this way an information bit string, which is reception data, is obtained.

When long information is transmitted, the conventional OFDM communication apparatus above inserts, as shown in FIG. 1, propagation path response estimation pilot symbols (hatched areas) into information OFDM symbols at certain intervals to follow up variations of momentarily changing propagation path response. That is, as shown in FIG. 2, information OFDM symbols 1 to n are compensated using a propagation path estimated value obtained by pilot symbol A and information OFDM symbols n+1 to 2n are compensated using a propagation path estimated value obtained by pilot symbol B.

However, when such long information is transmitted, following up time variations in the propagation path makes it necessary to frequently insert known signals such as pilot symbols, causing a problem of deteriorating the transmission efficiency.

SUMMARY OF THE INVENTION

It is an object of the present invention to provide an OFDM communication apparatus and propagation path estimation method capable of adaptively following up time variations of a transmission path and improving a reception characteristic without reducing the transmission efficiency even if there are considerable time variations in propagation path response.

A subject of the present invention is to adaptively follow up time variations of a transmission path and achieve an excellent reception characteristic by adaptively estimating propagation path response using an error-corrected signal, that is, using a judged value of the received information signal as a known signal without frequently inserting pilot symbols for propagation path estimation and without reducing the transmission efficiency even when long information is transmitted.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below.

Embodiment 1

Figure 1:
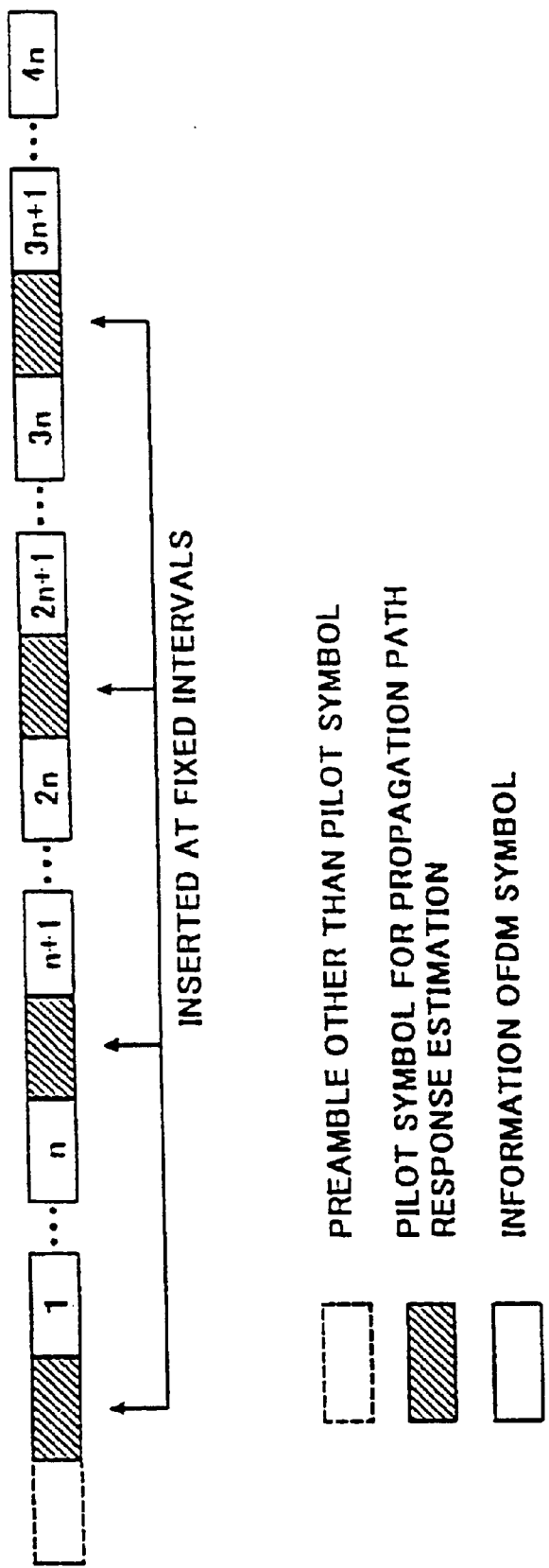
FIG. 1 is a diagram showing a symbol configuration used by a conventional propagation path estimation method.
Figure 2:
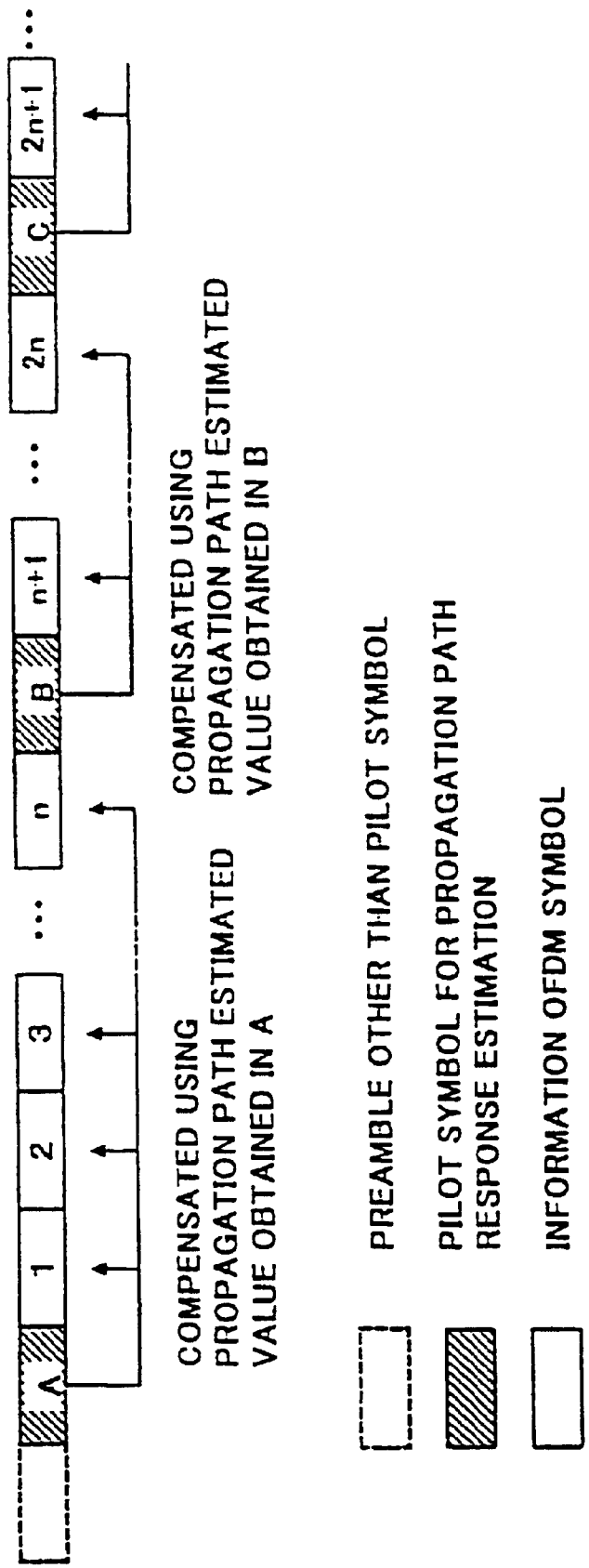
FIG. 2 is a diagram to explain the conventional propagation path estimation method.
Figure 3:
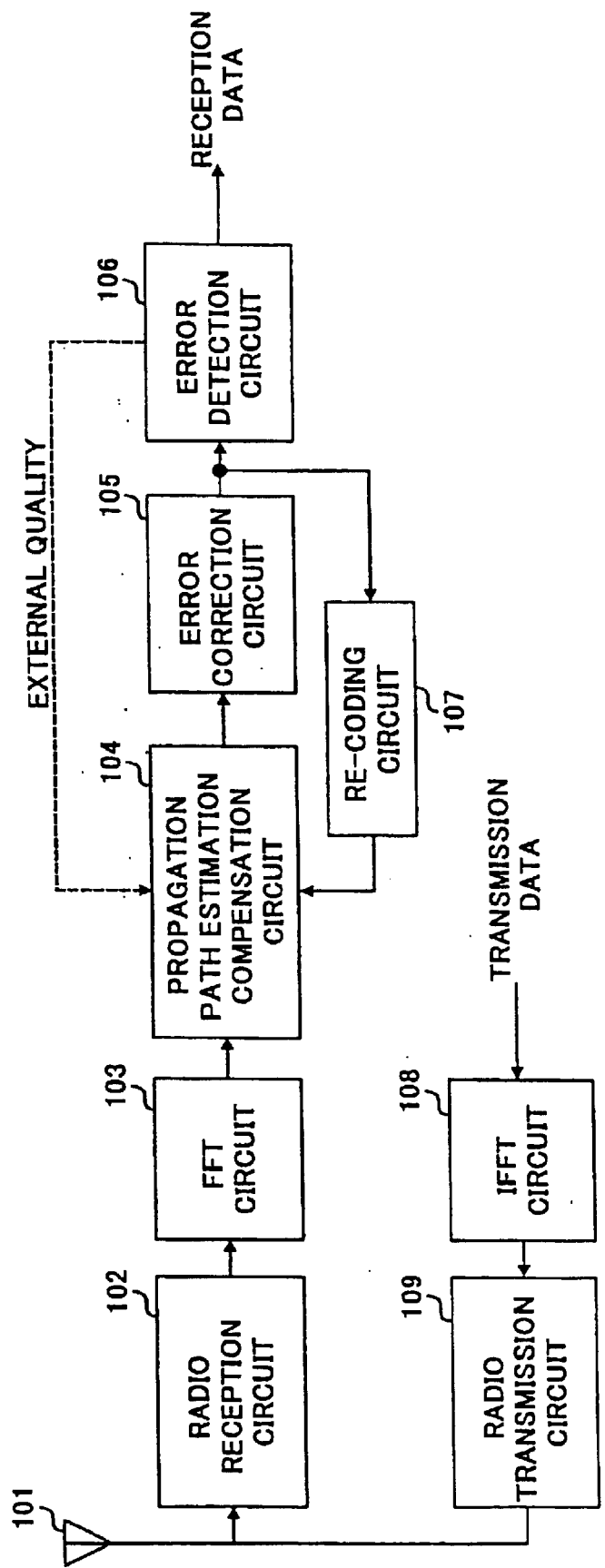
FIG. 3 is a block diagram showing a configuration of an OFDM communication apparatus according to Embodiment 1 of the present invention.
Figure 6:
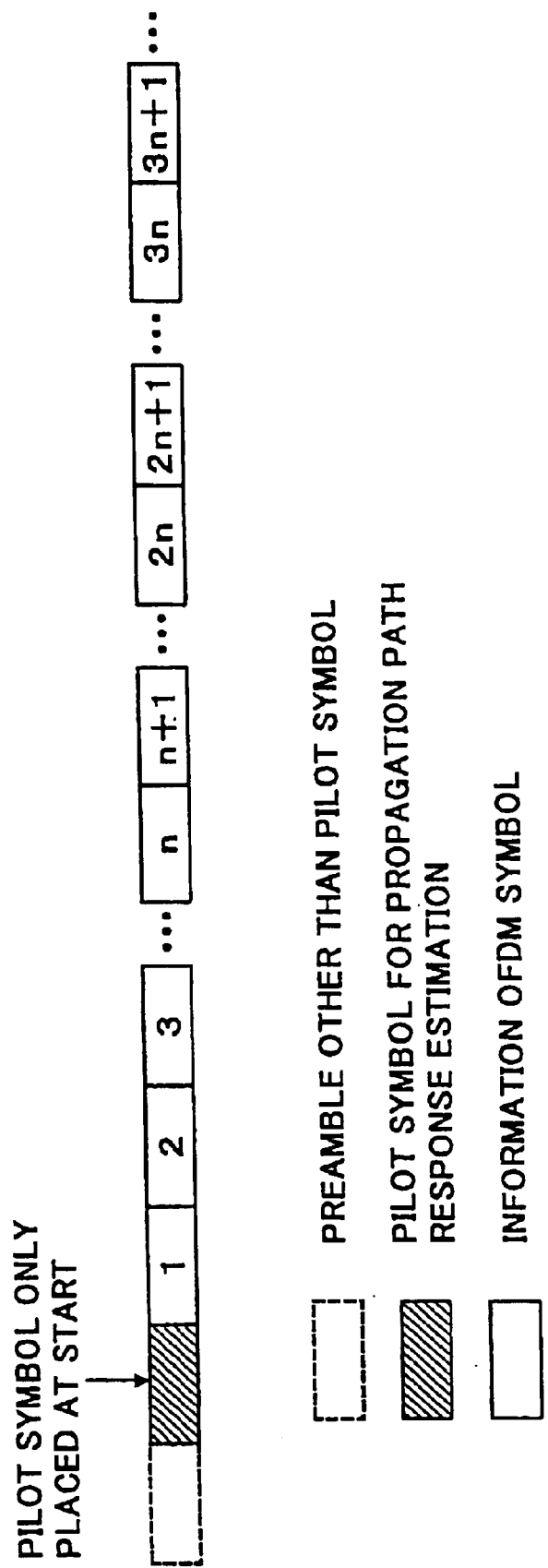
FIG. 6 is a diagram showing a symbol configuration used by a propagation path estimation method according to the present invention.

FIG. 3 is a block diagram showing a configuration of an OFDM communication apparatus according to Embodiment 1 of the present invention. A signal used for an OFDM communication has a configuration shown in FIG. 6. That is, the signal has a configuration with a preamble other than a pilot symbol followed by a propagation path response estimation pilot symbol, which is a known signal, and information OFDM symbols. Thus, a propagation path estimation pilot symbol is added only at the start of the information symbol to be transmitted.

An OFDM signal received through antenna 101 is subjected to normal radio reception processing by radio reception circuit 102 and converted to a baseband signal. This baseband signal is subjected to coherent detection processing by a coherent detector, stripped of the unnecessary frequency component by a low-pass filter and converted from analog to digital. Here, the reception signal is divided into an in-phase component and quadrature component by the coherent detection processing, but these two components are expressed as one signal path in the figure.

This baseband signal is subjected to an FFT (Fast Fourier Transform) operation by FFT circuit 103 and in this way signals assigned to different subcarriers are obtained. The signal subjected to the FFT operation by FFT section 103 is sent to propagation path estimation/compensation circuit 104 where a first propagation path estimated value (initial value) is obtained by performing propagation path estimation by carrying out a complex multiplication on a pilot symbol and known signal contained in the reception OFDM signal.

Propagation path estimation/compensation circuit 104 performs propagation path distortion compensation of information OFDM symbols one by one using the first propagation path estimated value. The information symbols subjected to propagation path distortion compensation are sent to correction circuit 105 one by one where these symbols are subjected to error correction. Error correction circuit 105 outputs an information bit string subjected to error correction for every unit of transmission path coding. This information bit string is sent to error detection circuit 106 where the information bit string is subjected to error detection and output as reception data.

The information bit string after error correction is periodically sent to re-coding circuit 107. Re-coding circuit 107 performs transmission path coding processing, modulation processing and rearrangement processing on the error-corrected information bit again. Thus, this re-coded and error-corrected information bit string is sent to propagation path estimation/compensation circuit 104. Propagation path estimation/compensation circuit 104 uses this re-coded information bit as a known signal, performs propagation path estimation by carrying out a complex multiplication with the FFT-operated signal and obtains a propagation path estimated value. This propagation path estimated value is updated to a first propagation path estimated value.

Propagation path distortion compensation is carried out by performing a complex multiplication on this new first propagation path estimated value and the information OFDM symbol. The reception signal with propagation path distortion compensated is sent to error correction circuit 105 where the reception signal is subjected to error correction. The information bit string output from error correction circuit 105 is sent to error detection circuit 106 where the information bit string is subjected to error detection and output as reception data.

The propagation path estimated value can also be updated for every information bit or for every two or more information bits. When the propagation path estimated value is updated for every two or more information bits, a switch, etc. can be provided after error correction circuit 105 so that the output to re-coding circuit 107 and output to error detection circuit 106 are switched through a control signal.

On the other hand, an information signal, which is transmission data for every subcarrier, is subjected to digital modulation processing by, for example, QPSK (Quadrature Phase Shift Keying) or QAM (Quadrature Amplitude Modulation), etc. and subjected to an IFFT operation by IFFT (Inverse Fast Fourier Transform) circuit 108 and converted to an OFDM signal. This OFDM signal is converted from digital to analog, sent to radio transmission circuit 109 where it is subjected to normal radio transmission processing and transmitted via antenna 101 as a transmission signal.

Next, the operation of the OFDM communication apparatus with the configuration above will be explained. An OFDM signal received by antenna 101 is subjected to normal radio reception processing by radio reception circuit 102, converted to a baseband signal, subjected to an FFT operation by FFT circuit 103 and converted to signals assigned to subcarriers.

Figure 4:
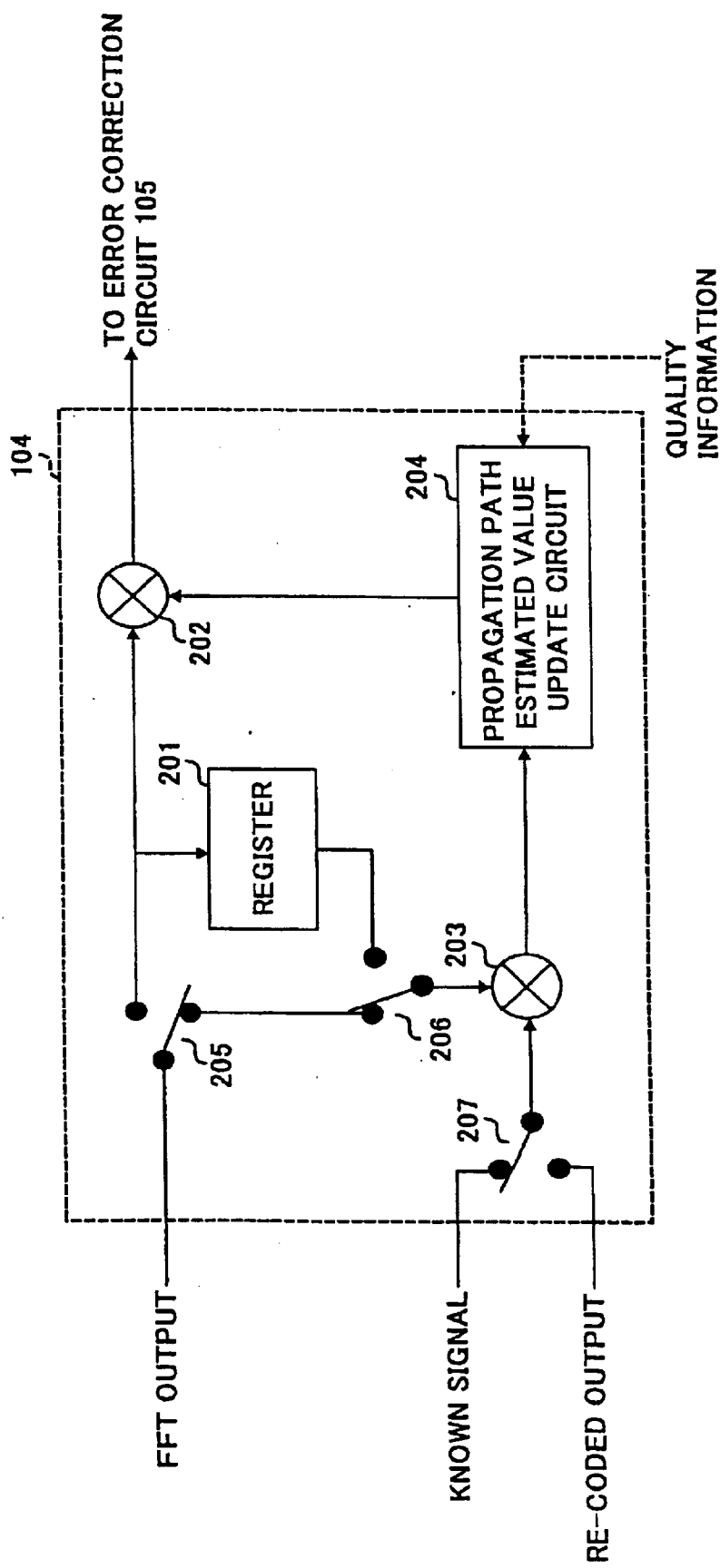
FIG. 4 is a block diagram showing an internal configuration of a propagation path estimation/compensation circuit of the OFDM communication apparatus according to Embodiment 1 of the present invention.

This signal is sent to propagation path estimation/compensation circuit 104. As shown in FIG. 4, propagation path estimation/compensation circuit 104 includes register 201 that stores the output from FFT circuit 103, multiplier 203 that carries out a complex multiplication on this FFT output and a known signal or the output from re-coding circuit 107, propagation path estimated value update circuit 204 that stores a propagation path estimated value, which is the output of multiplier 203, and updates it to a new propagation path estimated value and multiplier 202 that carries out a complex multiplication on the propagation path estimated value and FFT output.

Furthermore, propagation path estimation/compensation circuit 104 also includes switch 205 to switch between multiplier 203 and multiplier 202 to output the FFT output, switch 206 to switch between the output from FFT circuit 103 and FFT output stored in register 201 to output to multiplier 203 and switch 207 to switch between the known signal and the output from re-coding circuit 107 to output to multiplier 203.

Figure 5:
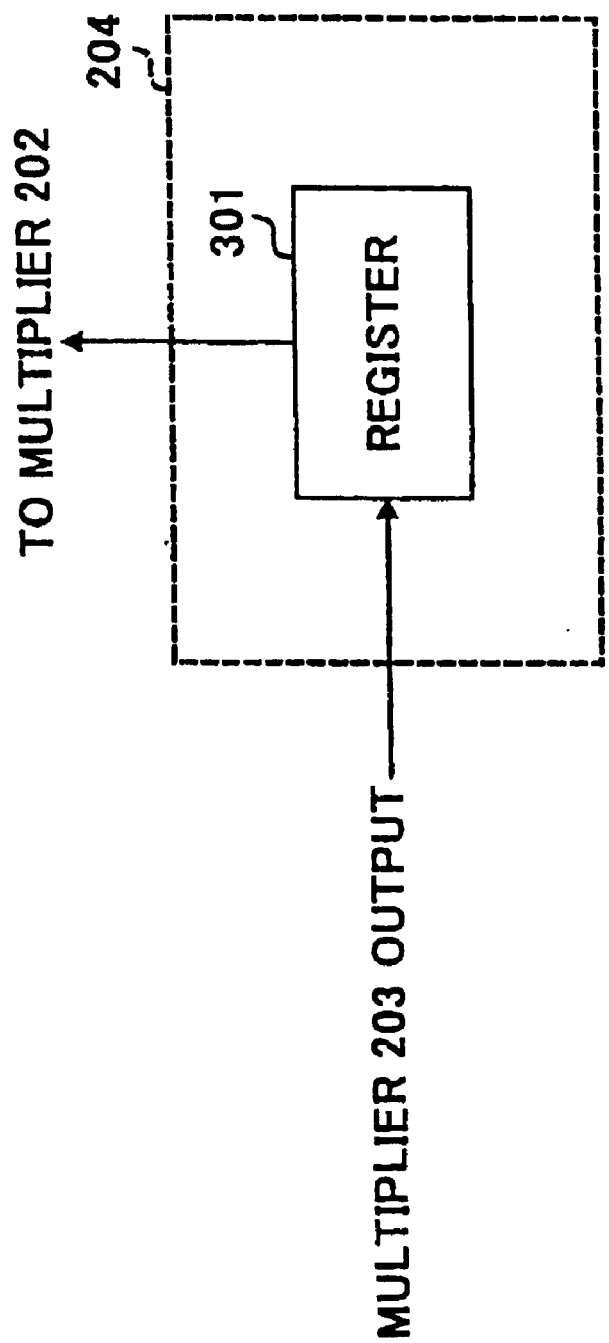
FIG. 5 is a block diagram showing an internal configuration of the propagation path estimated value update circuit shown in FIG. 4.

Furthermore, propagation path estimated value update circuit 204 includes register 301 as shown in FIG. 5.

First, propagation path estimation/compensation is performed using a pilot symbol. A signal sent to propagation path estimation/compensation circuit 104, that is, FFT output is sent to multiplier 203 and multiplier 203 performs a complex multiplication on a pilot symbol and known symbol of the FFT output. In this way, a first propagation path estimated value (initial value) is obtained. At this time, switches 205 to 207 are set so that the FFT output and known signal are input to multiplier 203. This propagation path estimated value is stored in register 301 of propagation path estimated value update circuit 204.

Furthermore, this propagation path estimated value is sent to multiplier 202 and multiplier 202 multiplies the propagation path estimated value by the information symbol of the FFT output. In this way, propagation path distortion compensation is performed on the information symbol. The information symbol subjected to such propagation path distortion compensation is sent to error correction circuit 105.

The information symbol subjected to propagation path distortion compensation is sent to error correction circuit 105 where the information symbol is subjected to error correction and then sent to error detection circuit 106 where the information symbol is subjected to error detection and output as reception data.

Then, propagation path estimation/compensation is carried out using the error-corrected information bits. The error-corrected information bits are periodically sent to re-coding circuit 107. Re-coding circuit 107 performs transmission path coding processing, modulation processing and rearrangement processing on the error-corrected information bits again. Thus, the re-coded and error-corrected information bit string is sent to multiplier 203 of propagation path estimation/compensation circuit 104. Propagation path estimation/compensation circuit 104 uses this re-coded information bit instead of a known signal and performs a complex multiplication on this re-coded information bit and FFT output. At this time, the FFT output is stored in register 201. In this case, switches 205 to 207 are set so that the FFT output stored in register 201 and re-coded output are output to multiplier 203.

In this way, a propagation path estimated value is obtained by performing a complex multiplication on the re-coded information bit and FFT output. This propagation path estimated value is sent to propagation path estimated value update circuit 204. Then, using this propagation path estimated value, the propagation path estimated value (initial value) stored in register 301 of propagation path estimated value update circuit 204 is updated.

Furthermore, the updated propagation path estimated value is sent to multiplier 202 and multiplier 202 multiplies the updated propagation path estimated value by the information symbol of the FFT output. In this way, propagation path distortion compensation is carried out on the information symbol. The information symbol subjected to such propagation path distortion compensation is sent to error correction circuit 105.

The information symbol with propagation path distortion compensated is sent to error correction circuit 105, subjected to error correction, then sent to error detection circuit 106 where the information symbol is subjected to error detection and output as reception data.

Figure 7:
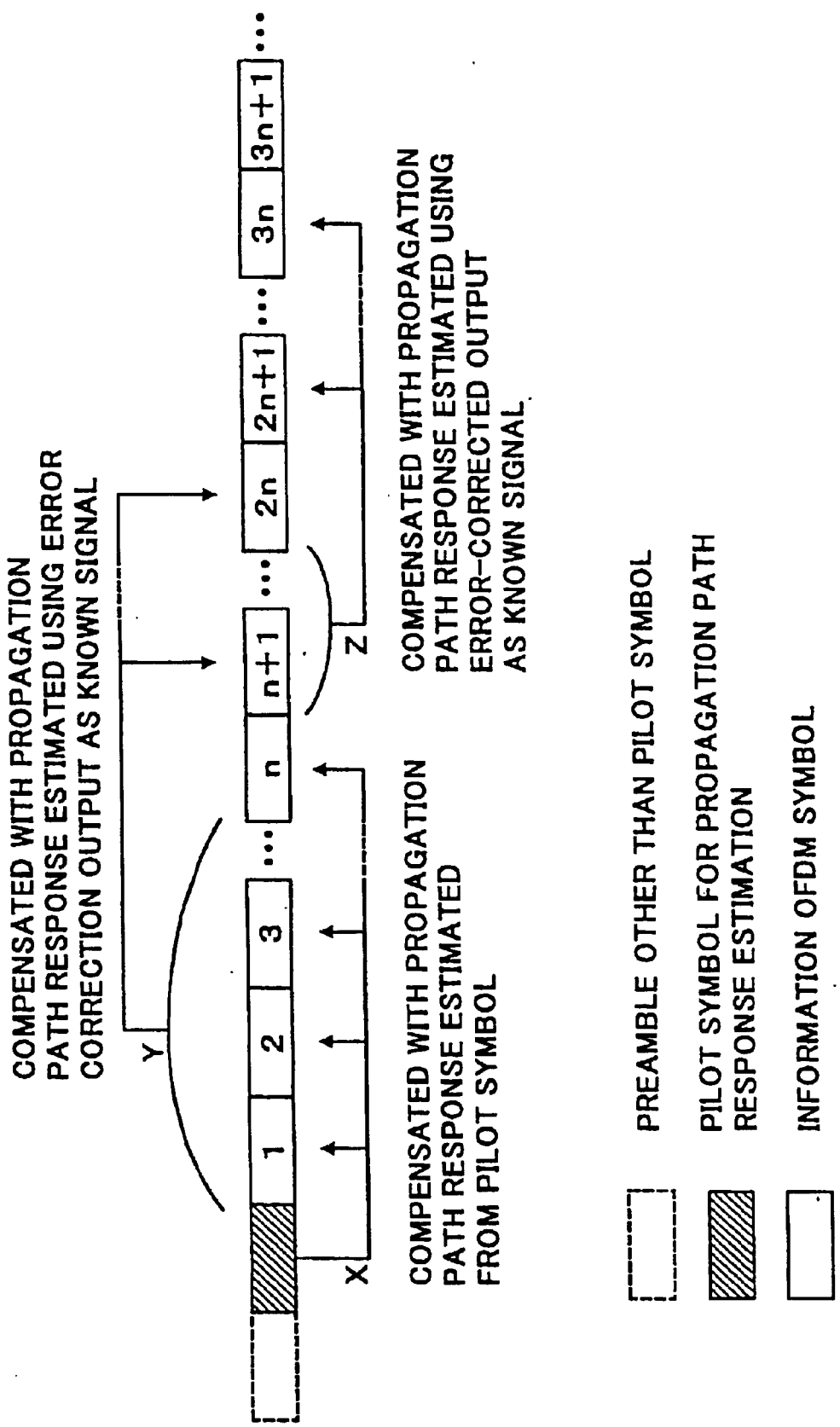
FIG. 7 is a diagram to explain the propagation path estimation method according to the present invention.

According to such a propagation path estimation method, as shown in FIG. 7, propagation path distortion compensation is performed on information bits 1 to n with propagation path estimated value (X) calculated using a pilot symbol (hatched area), propagation path distortion compensation is performed on information bits n+1 to 2n with propagation path estimated value (Y) calculated using the error correction outputs of information bits 1 to n as a known signal, and propagation path distortion compensation is performed on information bits 2n+1 to 3n with propagation path estimated value (Y) calculated using the error-corrected outputs of information bits n+1 to 2n as a known signal. Therefore, even if long information is transmitted, it is possible to estimate propagation path response without inserting pilot symbols between information OFDM symbols, which are continuously transmitted, which allows an excellent reception characteristic to be obtained without reducing the transmission efficiency.

Moreover, when the error-corrected output of information bits is used as a known signal, it is also possible to obtain quality information on a plurality of information bits, input the quality information to propagation path estimated value update circuit 204 and determine which information bit error-corrected output is appropriate for a known signal to calculate the transmission path estimated value. This allows an optimal propagation path estimated value to be obtained and appropriate propagation path distortion compensation to be performed for the information bits. Thus, it is possible to maintain a low error rate by adaptively following up time variations of the transmission path without reducing the transmission efficiency even when long information is transmitted or when there are considerable time variations of propagation path response.

Embodiment 2

In the OFDM communication apparatus according to this embodiment, propagation path estimated value update circuit 204 updates a propagation path estimated value using both the propagation path estimated value obtained using information bits after error correction and a past propagation path estimated value.

The configuration of the OFDM communication apparatus according to this embodiment is the same as that of Embodiment 1 except the propagation path estimated value update circuit, and therefore the propagation path estimated value update circuit will be explained.

Figure 8:
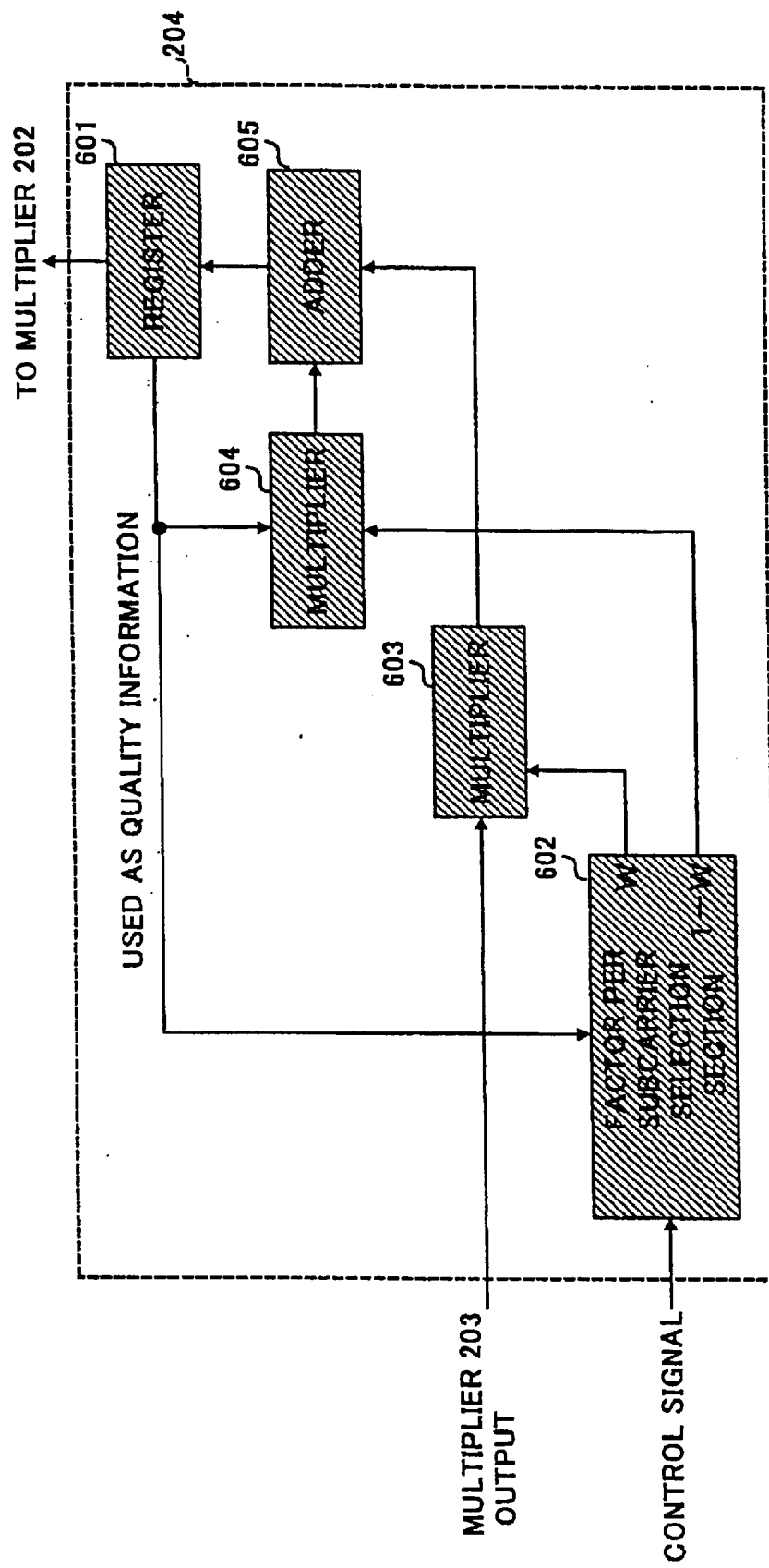
FIG. 8 is a block diagram showing an internal configuration of a propagation path estimated value update circuit in a propagation path estimation/compensation circuit of an OFDM communication apparatus according to Embodiment 2 of the present invention.

FIG. 8 is a block diagram showing an internal configuration of a propagation path estimated value update circuit in a propagation path estimation/compensation circuit of the OFDM communication apparatus according to Embodiment 2 of the present invention. This propagation path estimated value update circuit includes register 601 that stores a propagation path estimated value and outputs it to multiplier 202, multipliers 603 and 604 that multiply the propagation path estimated value stored in register 601 by a weighting factor, adder 605 that adds up the multiplication results of multipliers 603 and 604 and factor per subcarrier selection section 602 that selects the output of multiplier 203 or a weighting factor of a past propagation path estimated value stored in register 601 according to a control signal.

The propagation path estimated value update circuit shown in FIG. 8 updates a propagation path estimated value using both the propagation path estimated value obtained using the error-corrected information bits and a past propagation path estimated value, and the propagation path estimated value to be updated follows, for example, expression (1) below:

(Updated estimated value)=$W$×(output of multiplier 203)+(1−$W$)× (immediately preceding estimated value)     expression (1)

where, W is a weighting factor and given by factor per subcarrier selection section 602. Factor per subcarrier selection section 602 gives a weighting factor for every subcarrier based on the past propagation path estimated values. Factor per subcarrier selection section 602 selects a preset weighting factor according to a control signal based on information such as channel quality. Here, an identical weighting factor can be used in all cases.

More specifically, propagation path estimated value update circuit 204 outputs a past (here immediately preceding) propagation path estimated value from register 601 to multiplier 604. On the other hand, a propagation path estimated value (output of multiplier 203) obtained using the error-corrected current information bit as a known signal is output to multiplier 603.

According to a control signal based on information such as channel quality, factor per subcarrier selection section 602 selects a weighting factor (W) to be multiplied on a current propagation path estimated value and past propagation path estimated value, outputs the current propagation path estimated value to multiplier 603 and outputs the past propagation path estimated value to multiplier 604.

Multipliers 603 and 604 perform weighting on the current propagation path estimated value and past propagation path estimated value, respectively and their results are output to adder 605. Adder 605 adds up the weighted propagation path estimated values and calculates a propagation path estimated value to be updated. The calculated propagation path estimated value is sent to register 601 and the propagation path estimated value stored in the register is updated.

According to this embodiment, a new propagation path estimated value is obtained also using a past propagation path estimated value, and therefore it is possible to achieve high estimation accuracy using this propagation path estimated value and perform propagation path distortion compensation on information bits more accurately.

Embodiment 3

The OFDM communication apparatus according to this embodiment adds a process of averaging propagation path estimated values corresponding to n symbols using error-corrected information bits.

The configuration of the OFDM communication apparatus according to this embodiment is the same as that of Embodiment 1 except the propagation path estimated value update circuit, and therefore the propagation path estimated value update circuit will be explained.

Figure 9:
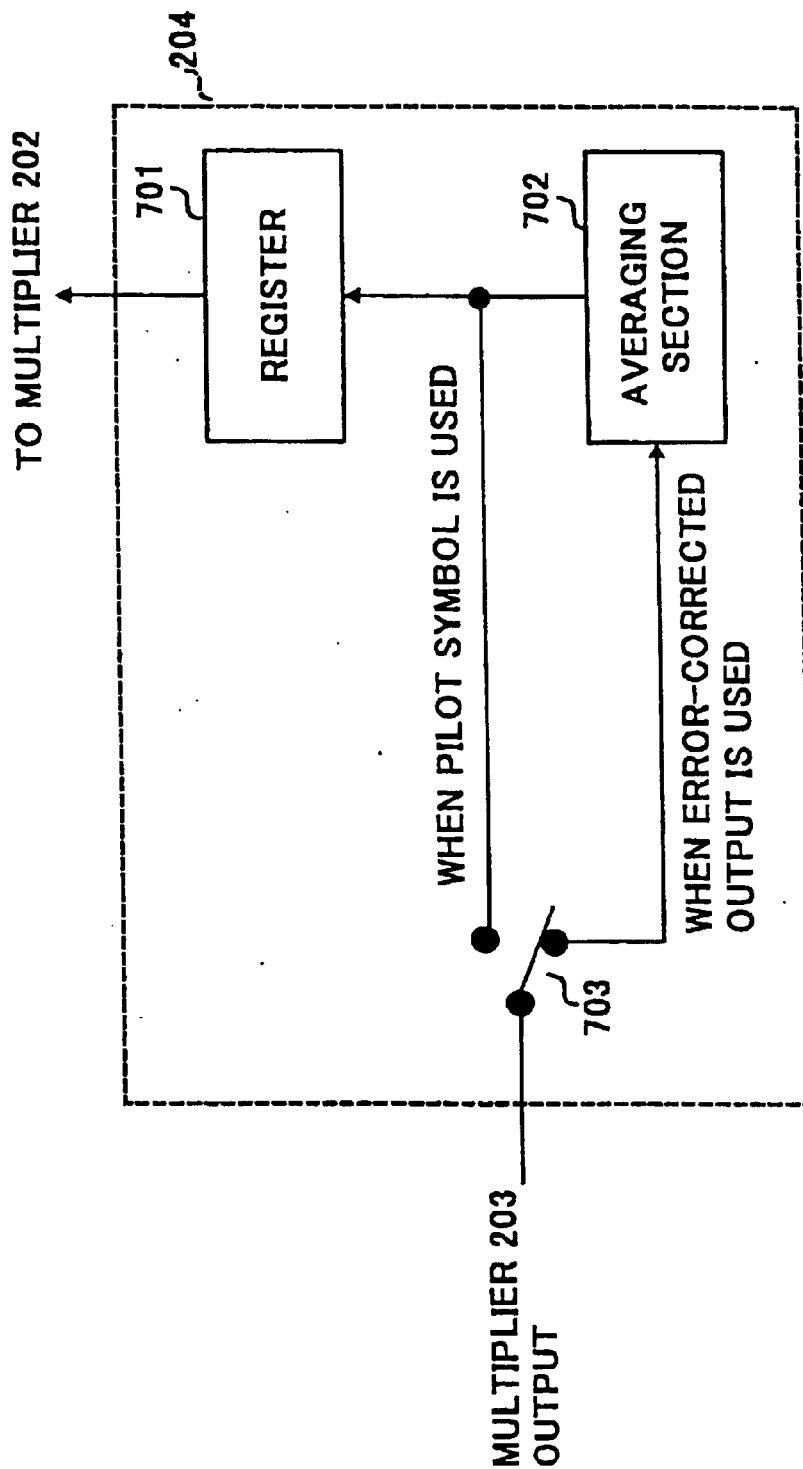
FIG. 9 is a block diagram showing an internal configuration of a propagation path estimated value update circuit in a propagation path estimation/compensation circuit of an OFDM communication apparatus according to Embodiment 3 of the present invention.

FIG. 9 is a block diagram showing an internal configuration of a propagation path estimated value update circuit in a propagation path estimation/compensation circuit of the OFDM communication apparatus according to Embodiment 3 of the present invention. This propagation path estimated value update circuit includes register 701 that stores a propagation path estimated value and outputs it to multiplier 202 and averaging section 702 that averages the propagation path estimated values corresponding to n symbols obtained using error-corrected information bits. Furthermore, the propagation path estimated value update circuit includes switch 703 that switches whether to output a propagation path estimated value (output of multiplier 203) directly to register 701 or to averaging section 702.

With this configuration, when a propagation path estimated value is calculated using a pilot symbol, switch 703 is set so that the output of multiplier 203 is sent to register 701 and the propagation path estimated value is sent to register 701 and stored in register 701. Moreover when a propagation path estimated value is calculated using the error-corrected information bit, switch 703 is set so that the output of multiplier 203 is sent to averaging section 702 and a propagation path estimated value is sent to averaging section 702 and propagation path estimated values corresponding to n symbols are averaged. The averaged propagation path estimated value is sent to register 701 and the propagation path estimated value stored in register 701 is updated. When the amplitude of the transmission signal contains information as in the case of multi-value QAM, averaging section 702 can also be configured in such a way as not to include values of signal points with a small amplitude in averaging and to reduce deterioration by additive noise.

According to this embodiment, newly acquired propagation path estimated values are averaged for a plurality of symbols, and therefore it is possible to reduce estimated errors due to additive noise, achieve high estimation accuracy using this propagation path estimated value and perform propagation path distortion compensation on information bits more accurately.

Embodiment 4

In the OFDM communication apparatus according to this embodiment, propagation path estimated value update circuit 204 adds a process of averaging propagation path estimated values corresponding to n symbols obtained by using error-corrected information bits and further updates propagation path estimated value using both the averaged propagation path estimated value and past propagation path estimated value.

Since the configuration of the OFDM communication apparatus according to this embodiment is the same as that of Embodiment 1 except the propagation path estimated value update circuit, the propagation path estimated value update circuit will be explained.

Figure 10:
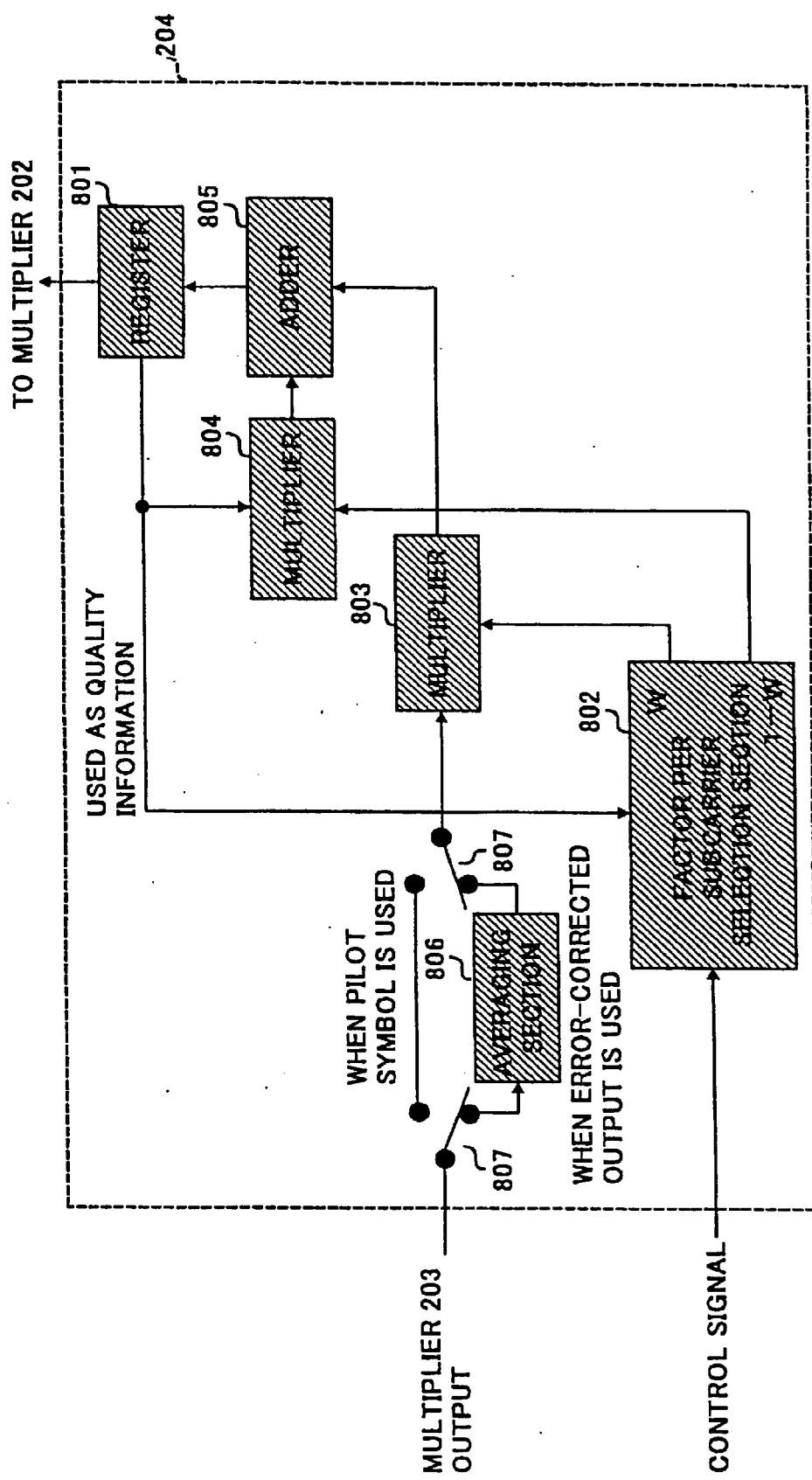
FIG. 10 is a block diagram showing an internal configuration of a propagation path estimated value update circuit in a propagation path estimation/compensation circuit of an OFDM communication apparatus according to Embodiment 4 of the present invention.

FIG. 10 is a block diagram showing an internal configuration of a propagation path estimated value update circuit in a propagation path estimation/compensation circuit of the OFDM communication apparatus according to Embodiment 4 of the present invention. This propagation path estimated value update circuit includes register 801 that stores a propagation path estimated value and outputs it to multiplier 202, multipliers 803 and 804 that multiply the propagation path estimated value stored in register 801 by a weighting factor, adder 805 that adds up the multiplication results of multipliers 803 and 804, factor per subcarrier selection section 802 that selects the output of multiplier 203 and weighting factors of the past propagation path estimated values stored in register 801 according to a control signal and averaging section 806 that averages propagation path estimated values corresponding to n symbols obtained by using error-corrected information bits. Furthermore, the propagation path estimated value update circuit includes switch 807 that selects whether to directly output the propagation path estimated value (output of multiplier 203) to multiplier 803 or output it to averaging section 806 and then output to multiplier 803.

The propagation path estimated value update circuit shown in FIG. 10 averages propagation path estimated values corresponding to n symbols obtained by using error-corrected information bits and further updates propagation path estimated values using both the averaged propagation path estimated value and the past propagation path estimated value, and the propagation path estimated value to be updated follows, for example, expression (2) below.

(Updated estimated value)=W×(output of averaging section)+(1−W)×(immediately preceding estimated value)  expression (2)

where, W is a weighting factor and is given by factor per subcarrier selection section 802. Factor per subcarrier selection section 802 gives a weighting factor for every subcarrier based on the past propagation path response estimated value. Factor per subcarrier selection section 802 selects a preset weighting factor according to the control signal based on information such as channel quality. Here, an identical weighting factor can also be used in all cases.

More specifically, propagation path estimated value update circuit 204 outputs a past (here, immediately preceding) propagation path estimated value from register 801 to multiplier 804.

On the other hand, when a propagation path estimated value is calculated using a pilot symbol, switch 807 is set so that the output of multiplier 203 is sent to multiplier 803 and the propagation path estimated value is sent to multiplier 803 and multiplier 803 multiplies the propagation path estimated value by a weighting factor. Moreover when a propagation path estimated value is calculated using the error-corrected information bit, switch 807 is set so that the output of multiplier 203 is sent to averaging section 806 and a propagation path estimated value is sent to averaging section 806 and propagation path estimated values corresponding to n symbols are averaged. The averaged propagation path estimated value is sent to multiplier 803 and multiplier 803 multiplies the averaged propagation path estimated value by a weighting factor.

At this time, factor per subcarrier selection section 802 selects a weighting factor (W) to be multiplied on the averaged output of the current propagation path estimated value and past propagation path estimated value according to a control signal based on information such as channel quality, and outputs the weighting factor of the averaged output of the current propagation path estimated value to multiplier 803 and outputs the weighting factor of the past propagation path estimated value to multiplier 804.

Multipliers 803 and 804 perform weighting on the current propagation path estimated value and past propagation path estimated value, respectively and output their results to adder 805. Adder 805 adds up the weighted propagation path estimated values and calculates a new propagation path estimated value for updating. The calculated propagation path estimated value is sent to register 801 and the propagation path estimated value stored in the register is updated. When the amplitude of the transmission signal contains information as in the case of multi-value QAM, averaging section 806 can also be configured in such a way as not to include values of signal points with a small amplitude in averaging and to reduce deterioration by additive noise.

According to this embodiment, newly acquired propagation path estimated values are averaged for a plurality of symbols, and therefore it is possible to reduce estimated errors due to additive noise and achieve higher estimation accuracy because it obtains a new propagation path estimated value using a past propagation path response estimated value. As a result, it can perform propagation path distortion compensation on information bits more accurately.

Figure 11:
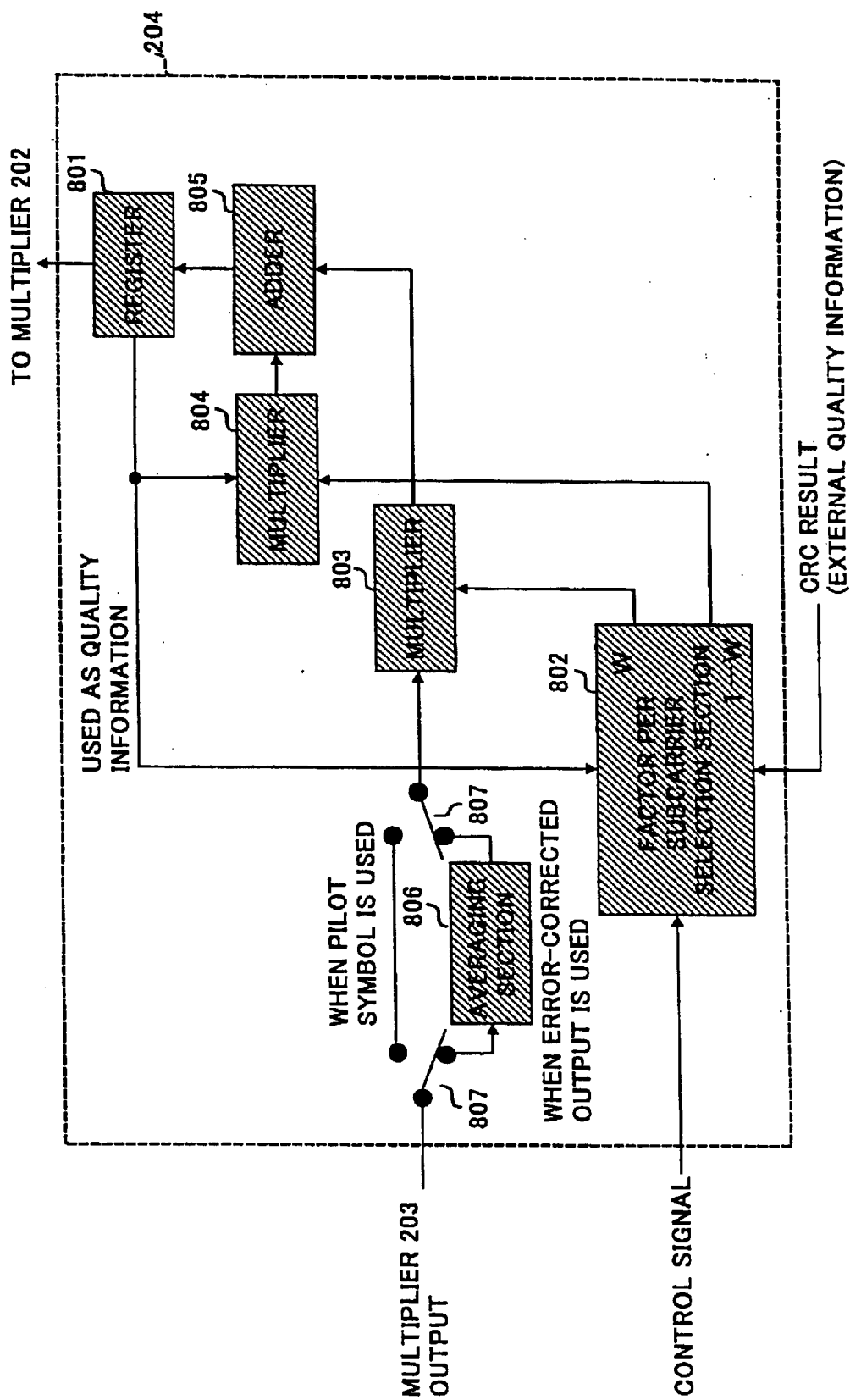
FIG. 11 is another block diagram showing the internal configuration of the propagation path estimated value update circuit in the propagation path estimation/compensation circuit of the OFDM communication apparatus according to Embodiment 4 of the present invention.

In this embodiment, it is also possible to input a CRC (Cyclic Redundancy Check) result to factor per subcarrier selection section 802 as external quality information as shown in FIG. 11. This setting is intended to prevent an averaging block including information bits for which the CRC result shows some errors from not being used as an averaging output. At this time, weighting factor W in expression (2) above becomes 0.

Thus, applying external quality information to weighting factor selection makes it possible to reduce estimation errors due to bit errors and drastically improve estimation accuracy.

Embodiment 5

The OFDM communication apparatus according to this embodiment uses a signal after propagation path distortion compensation as the information OFDM symbol stored to be used for successive propagation path estimation. More specifically, the OFDM communication apparatus according to this embodiment takes a difference between the information OFDM symbol after propagation path distortion compensation stored in the register and re-coded output and only updates the past propagation path estimated value by the portion corresponding to the difference.

Since the configuration of the OFDM communication apparatus according to this embodiment is the same as that of Embodiment 1 except the propagation path estimated value update circuit, the propagation path estimated value update circuit will be explained.

Figure 12:
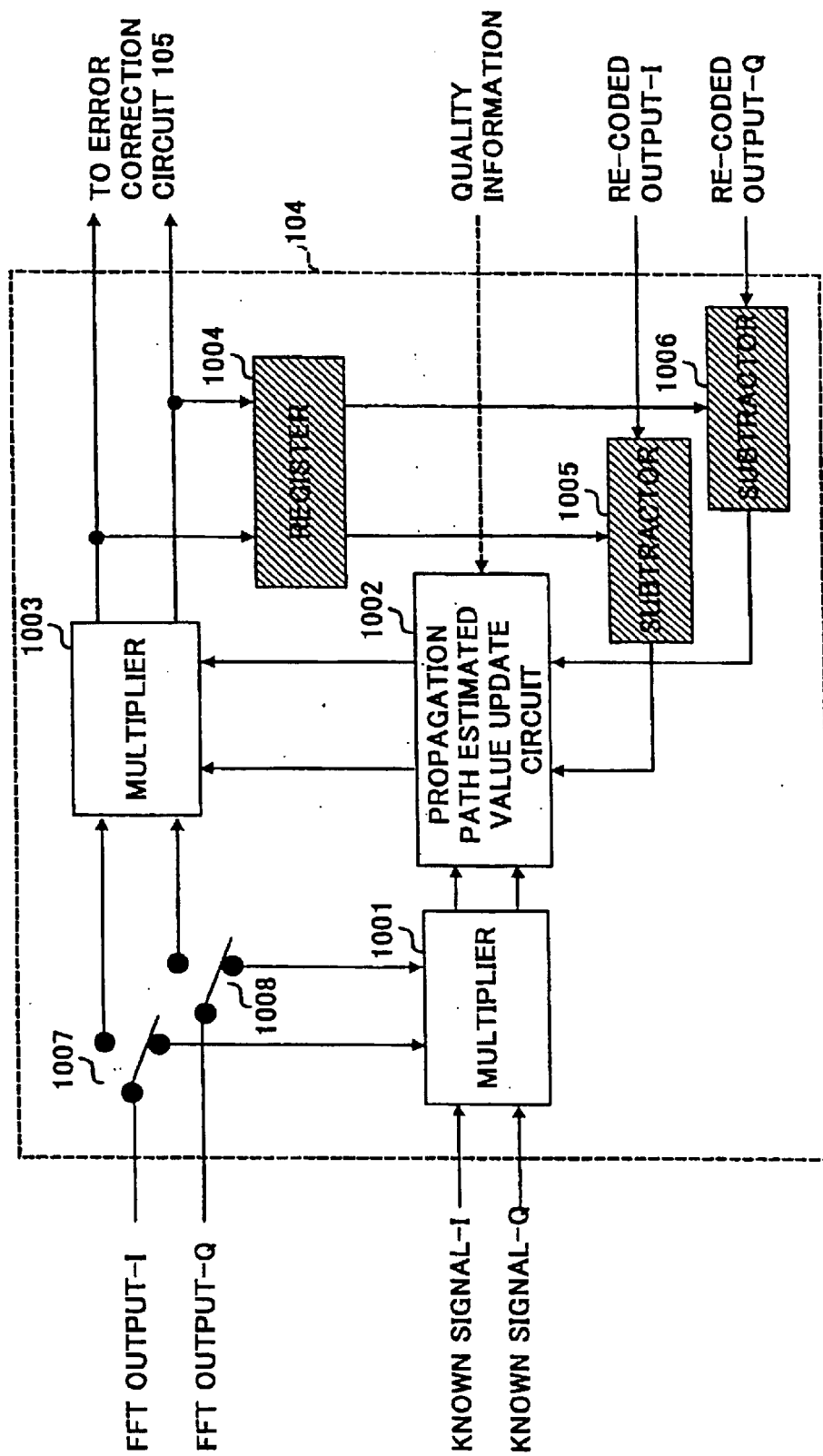
FIG. 12 is a block diagram showing an internal configuration of a propagation path estimation/compensation circuit of an OFDM communication apparatus according to Embodiment 5 of the present invention.

FIG. 12 is a block diagram showing an internal configuration of the propagation path estimation/compensation circuit of the OFDM communication apparatus according to Embodiment 5 of the present invention.

Propagation path estimation/compensation circuit 104 includes multiplier 1001 that carries out a complex multiplication on the output from FFT circuit 103 (FFT output) and a known signal, propagation path estimated value update circuit 1002 that stores the output of multiplier 1001, that is, a propagation path estimated value and updates it to a new propagation path estimated value, multiplier 1003 that carries out a complex multiplication on the output from propagation path estimated value update section 1002 and the FFT output, register 1004 that stores the information bit after propagation path distortion compensation, which is the output of multiplier 1003, and subtractors 1005 and 1006 that calculate a difference between the information bit after propagation path distortion compensation and the output of re-coding circuit 107. Furthermore, propagation path estimation/compensation circuit 104 includes switches 1007 and 1008 to switch between multipliers 1003 and 1001 to output the FFT output. Here, the FFT output, known signal and re-coded output are expressed by an I component and Q component.

Figure 13:
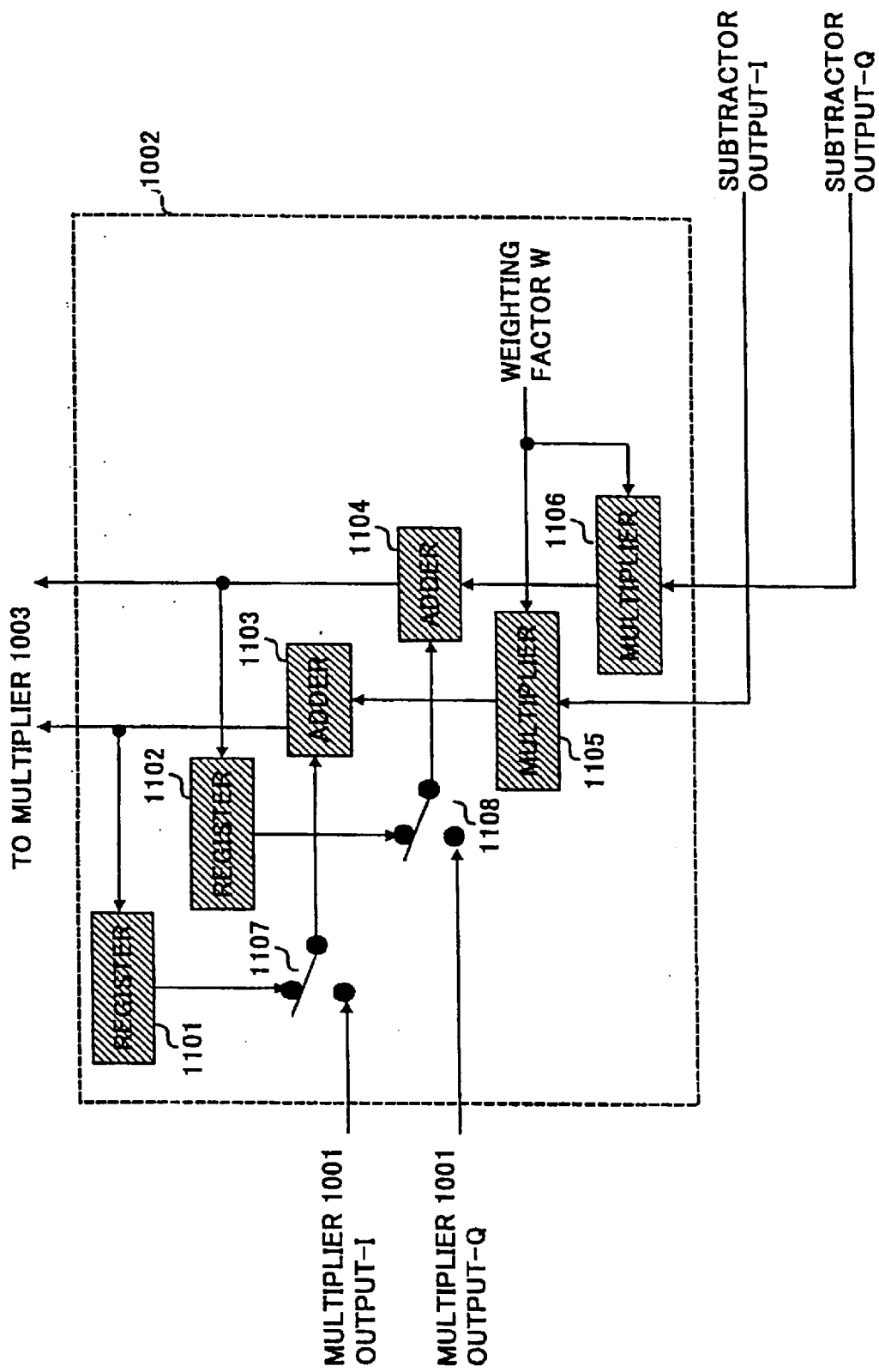
FIG. 13 is a block diagram showing an internal configuration of a propagation path estimated value update circuit in the propagation path estimation/compensation circuit of the OFDM communication apparatus according to Embodiment 5 of the present invention.

As shown in FIG. 13, this propagation path estimated value update circuit 1002 includes registers 1101 and 1102 that store a propagation path estimated value (output of multiplier 1001) and output it to adders 1103 and 1104, multipliers 1105 and 1106 that multiply the outputs of subtractors 1005 and 1006 by weighting factors and adders 1103 and 1104 that adds up the multiplication results of multipliers 1105 and 1106 and the propagation path estimated values stored in registers 1101 and 1102. Furthermore, propagation path estimated value update circuit 1002 includes switches 1107 and 1108 that switch between the output of register 1101 to adder 1103 and the output of multiplier 1001 to adder 104.

The operation of the OFDM communication apparatus with the above configuration will be explained. A signal sent to propagation path estimation/compensation circuit 104, that is, the FFT output is first sent to multiplier 1001 and multiplier 1001 carries out a complex multiplication on the I component and Q component of the FFT output and the I component and Q component of a known signal. In this way, a propagation path estimated value is obtained. At this time, switches 1007 and 1008 are set so that the FFT output and known signal are input to multiplier 1001. This propagation path estimated value is stored in registers 1101 and 1102 of propagation path estimated value update circuit 1002. At this time, switches 1107 and 1108 of propagation path estimated value update circuit 1002 are set so that the output of multiplier 1001 is sent to registers 1101 and 1102.

Furthermore, this propagation path estimated value is sent to multiplier 1003 and multiplier 1003 multiplies the I component and Q component of the FFT output and the I component and Q component of the information symbol. In this way, propagation path distortion compensation is carried out on the information symbol. The information symbol subjected to such propagation path distortion compensation is sent to error correction circuit 105. Moreover, the information symbol subjected to propagation path distortion compensation is stored in register 1004.

The information symbol subjected to propagation path distortion compensation is sent to error correction circuit 105 where the information symbol is subjected to error correction, and then sent to error detection circuit 106 where the information symbol is subjected to error detection and output as reception data.

Next, propagation path estimation/compensation is performed using the error-corrected information bit. The error-corrected information bit is periodically sent to re-coding section 107. Re-coding circuit 107 performs transmission path coding processing, modulation processing and rearrangement processing on the error-corrected information bit again. The I component of this re-coded and error-corrected information bit string is sent to subtractor 1005 of propagation path estimation/compensation circuit 104 and the Q component is sent to subtractor 1006 of propagation path estimation/compensation circuit 104.

Subtractor 1005 finds a difference between the I component of the re-coded and error-corrected information bit string and I component of the information bit stored in the register and subjected to propagation path distortion compensation and the difference value is input to multiplier 1105 of propagation path estimated value update circuit 1002. Subtractor 1006 finds a difference between the Q component of the re-coded and error-corrected information bit string and Q component of the information bit stored in the register and subjected to propagation path distortion compensation and the difference value is input to multiplier 1106 of propagation path estimated value update circuit 1002.

In multipliers 1105 and 1106, the difference value is multiplied by a weighting factor (0<W≦1). Thus, multiplying weighting factor W reduces the difference value, making it possible to prevent influences by large estimation errors. This weighting factor W can be either fixed or made variable according to the channel condition as appropriate.

The difference values multiplied by weighting factor W are sent to adders 1103 and 1104. Adder 1103 adds up the I component of the difference value and I component of the propagation path estimated value (output of multiplier 1001) and adder 1104 adds up the Q component of the difference value and Q component of the propagation path estimated value (output of multiplier 1001) and in this way a new propagation path estimated value is obtained. This new propagation path estimated value is sent to registers 1101 and 1102, updated and at the same time sent to multiplier 1003 of propagation path estimation/compensation circuit 104.

Multiplier 1003 performs a complex multiplication on the I component and Q component of the information symbol of the FFT output and the I component and Q component of the propagation path estimated value. In this way, the information symbol is subjected to propagation path distortion compensation. The information symbol subjected to propagation path distortion compensation is sent to error correction circuit 105.

The information symbol subjected to propagation path distortion compensation is sent to error correction circuit 105 where the information symbol is subjected to error correction, then sent to error detection circuit 106 where the information symbol is subjected to error detection and output as reception data.

Thus, this embodiment allows propagation path response to be estimated without inserting a pilot symbol between continuously transmitted information OFDM symbols, making it possible to obtain an excellent reception characteristic without reducing the transmission efficiency. Moreover, even if there is a residual phase error, this embodiment only corrects the difference while compensating the residual phase error, making it possible to reduce deterioration of the estimation accuracy due to the residual phase error.

Embodiment 6

In the OFDM communication apparatus according to this embodiment, propagation path estimated value update circuit 1002 adopts a variable weighting factor using a past propagation path estimated value as quality information.

Since the configuration of the OFDM communication apparatus according to this embodiment is the same as that of Embodiment 5 except the propagation path estimated value update circuit, the propagation path estimated value update circuit will be explained.

Figure 14:
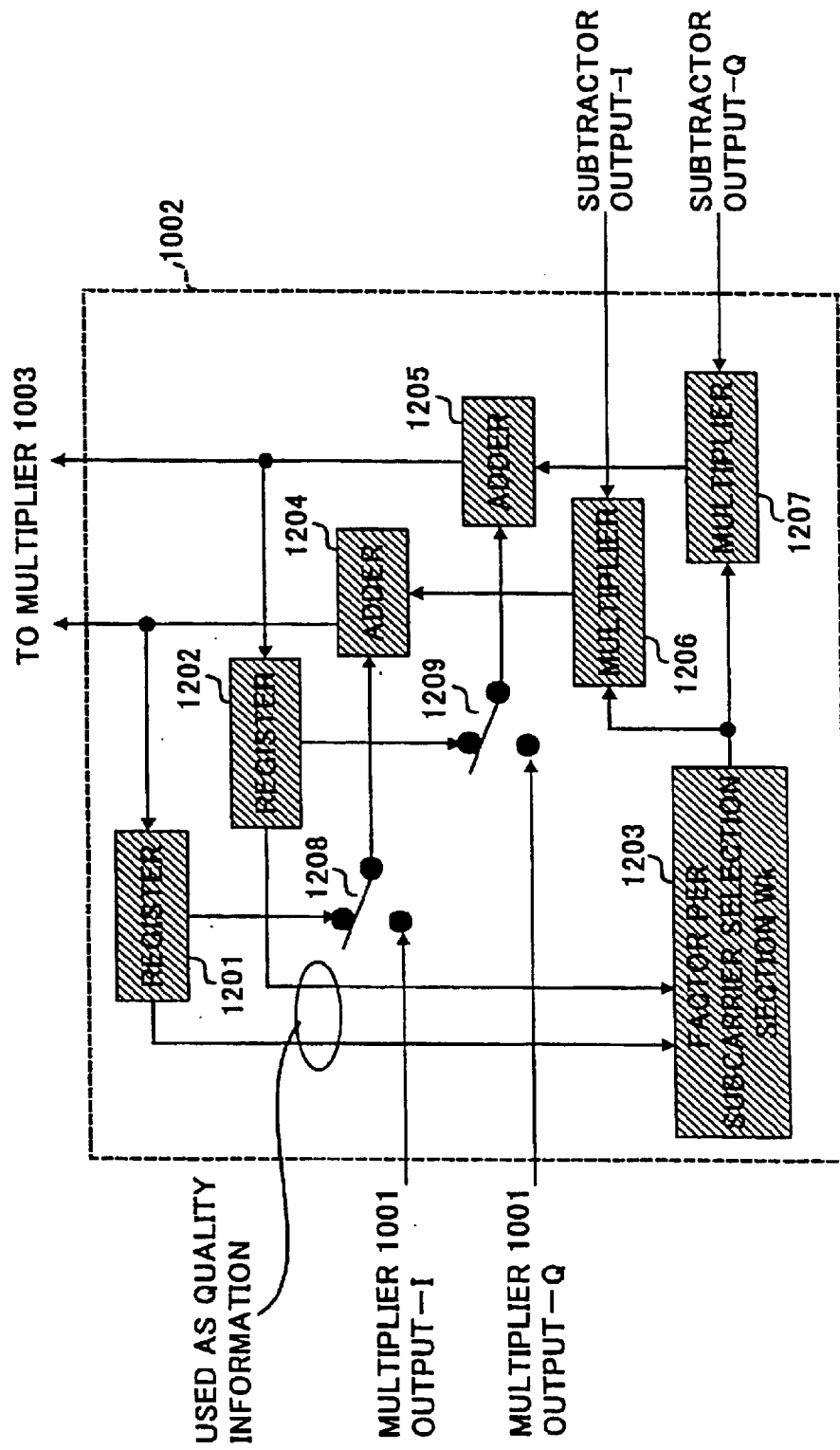
FIG. 14 is a block diagram showing an internal configuration of a propagation path estimated value update circuit in a propagation path estimation/compensation circuit of an OFDM communication apparatus according to Embodiment 6 of the present invention.

FIG. 14 is a block diagram showing an internal configuration of a propagation path estimated value update circuit of a propagation path estimation/compensation circuit of the OFDM communication apparatus according to Embodiment 6 of the present invention.

This propagation path estimated value update circuit 1002 includes registers 1201 and 1202 that store a propagation path estimated value (output of multiplier 1001) and output it to adders 1204 and 1205, multipliers 1206 and 1207 that multiply the outputs of subtractors 1005 and 1006 by a weighting factor, adders 1204 and 1205 that add up the multiplication results of multipliers 1206 and 1207 and the propagation path estimated values stored in registers 1201 and 1202 and factor per subcarrier selection section 1203 that selects weighting factor Wk using the propagation path estimated value stored in registers 1201 and 1202 as the quality information. Propagation path estimated value update circuit 1002 includes switches 1208 and 1209 that switch between the output of register 1201 to adder 1204 and the output of multiplier 1001 to adder 1204.

The operation of the OFDM communication apparatus with the above configuration will be explained. The propagation path estimated value (output of multiplier 1001) is stored in registers 1201 and 1202 of propagation path estimated value update circuit 1002. At this time, switches 1208 and 1209 of propagation path estimated value update circuit 1002 are set so that the output of multiplier 1001 is sent to registers 1201 and 1202.

The difference values from subtractors 1005 and 1006 are input to multipliers 1206 and 1207, respectively. Multipliers 1206 and 1207 multiply the difference values by weighting factor Wk. This weighting factor Wk is selected by factor per subcarrier selection section 1203. Factor per subcarrier selection section 1203 selects weighting factor Wk using the propagation path estimated value stored in registers 1201 and 1202 as quality information.

Thus, multiplying the difference values by weighting factor Wk reduces the difference values, making it possible to prevent influences due to large estimation errors.

The difference values multiplied by weighting factor Wk are sent to adders 1204 and 1205. Then, adder 1204 adds up the I component of the difference value and the I component of the propagation path estimated value (output of multiplier 1001) and adder 1205 adds up the Q component of the difference value and the Q component of the propagation path estimated value (output of multiplier 1001) and a new propagation path estimated value is obtained. This new propagation path estimated value is sent to registers 1201 and 1202, updated and at the same time sent to multiplier 1003 of propagation path estimation/compensation circuit 104.

Thus, this embodiment allows propagation path response to be estimated without inserting a pilot symbol between continuously transmitted information OFDM symbols and furthermore allows the percentage of updated low-reliability difference value to be reduced by changing the weighting factor for every subcarrier, thus making it possible to obtain an excellent reception characteristic without reducing the transmission efficiency. Moreover, even if there is a residual phase error, this embodiment only corrects the difference while compensating the residual phase error, making it possible to reduce deterioration of the estimation accuracy due to the residual phase error.

Embodiment 7

In the OFDM communication apparatus according to this embodiment, propagation path estimated value update circuit 1002 averages the outputs of subtractors.

Since the configuration of the OFDM communication apparatus according to this embodiment is the same as that of Embodiment 6 except the propagation path estimated value update circuit, the propagation path estimated value update circuit will be explained.

Figure 15:
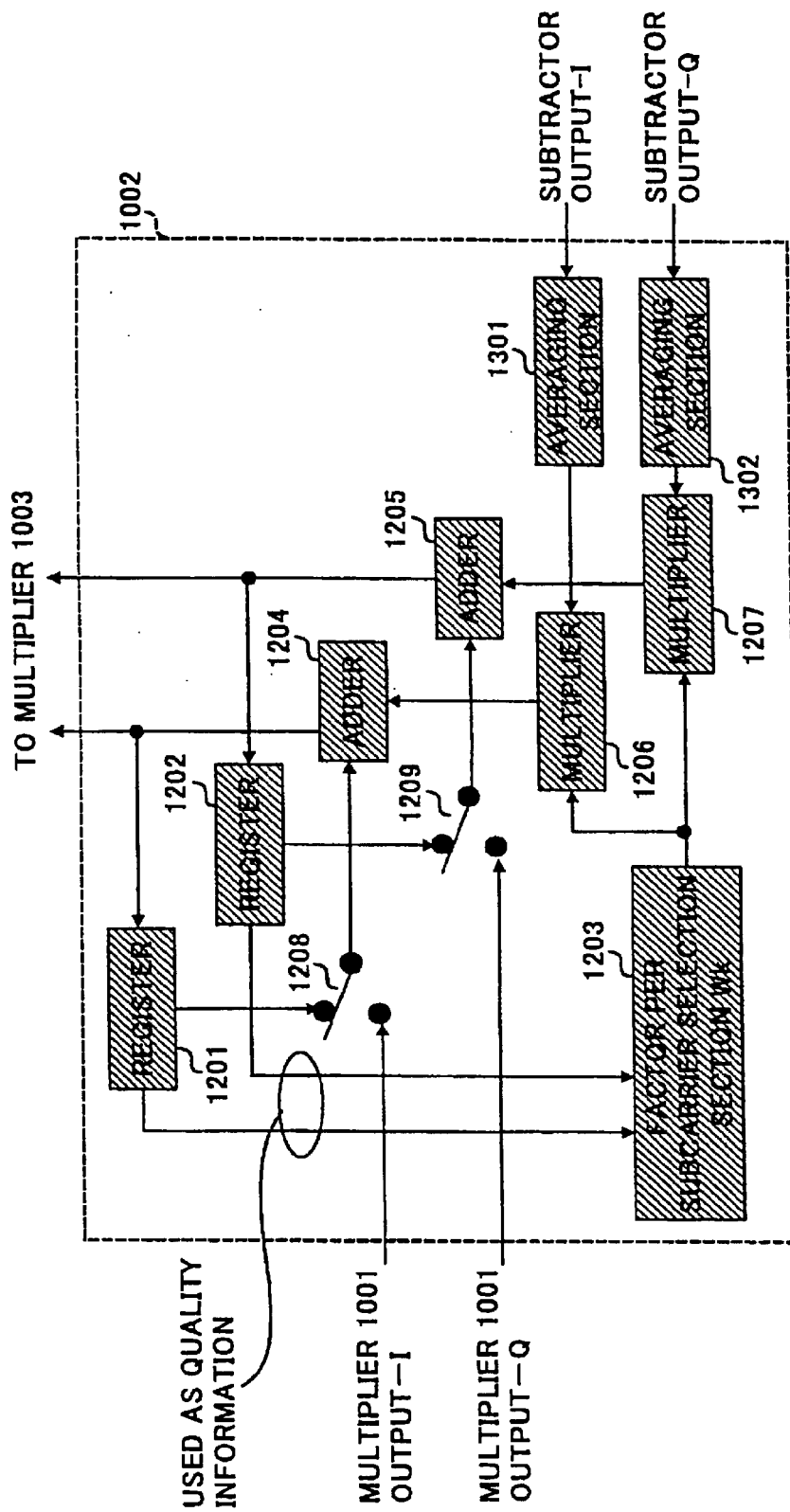
FIG. 15 is a block diagram showing an internal configuration of a propagation path estimated value update circuit in a propagation path estimation/compensation circuit of an OFDM communication apparatus according to Embodiment 7 of the present invention.

FIG. 15 is a block diagram showing an internal configuration of a propagation path estimated value update circuit in a propagation path estimation/compensation circuit of the OFDM communication apparatus according to Embodiment 7 of the present invention.

In propagation path estimated value update circuit 1002, the I component of a difference value from subtractor 1005 is input to averaging section 1301 and the Q component of a difference value from subtractor 1006 is input to averaging section 1302. Averaging sections 1301 and 1302 perform averaging processing on the difference values corresponding to n symbols. This I component of the averaged difference value is sent to multiplier 1206 and the Q component of the averaged difference value is sent to multiplier 1207. The processing hereafter is the same as that in Embodiment 6. When the amplitude of the transmission signal contains information as in the case of multi-value QAM, averaging sections 1301 and 1302 can also be configured in such a way as not to include values of signal points with a small amplitude in averaging and reduce deterioration by additive noise.

According to this embodiment, averaging the subtractor outputs allows the estimated value of propagation path variations to be obtained more accurately, making it possible to obtain an excellent reception characteristic without reducing the transmission efficiency. Moreover, even if there is a residual phase error, this embodiment only corrects the difference while compensating the residual phase error, making it possible to reduce deterioration of the estimation accuracy due to the residual phase error.

Figure 16:
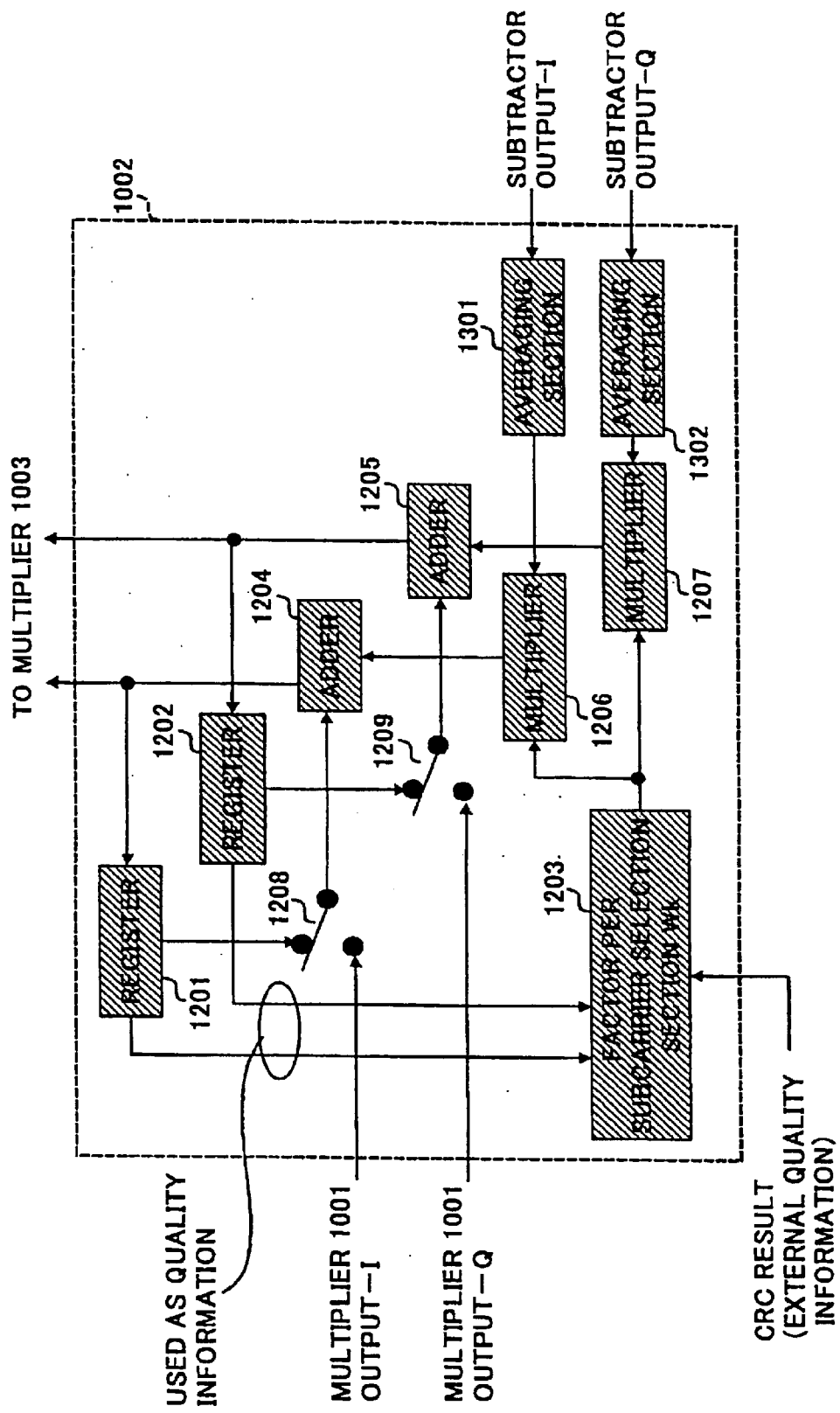
FIG. 16 is another block diagram showing the internal configuration of the propagation path estimated value update circuit in the propagation path estimation/compensation circuit of the OFDM communication apparatus according to Embodiment 7 of the present invention.

In this embodiment, it is also possible to input a CRC (Cyclic Redundancy Check) result to factor per subcarrier selection section 1203 as external quality information as shown in FIG. 16. This setting is intended to prevent an averaging block for which the CRC result shows some errors from not being used as a difference value of variations in the estimated propagation path.

Thus, applying external quality information to weighting factor selection makes it possible to obtain more accurate estimated values of variations in the propagation path, further eliminate difference value estimation errors due to bit errors and thereby obtain an excellent reception characteristic without reducing the transmission efficiency. Moreover, even if there is a residual phase error, this embodiment only corrects the difference while compensating the residual phase error, making it possible to reduce deterioration of the estimation accuracy due to the residual phase error.

The present invention is not limited to Embodiments 1 to 7 above, but can be implemented with various modifications. For example, Embodiments 1 to 7 above can be implemented in combination as appropriate.

The OFDM communication apparatus of the present invention comprises an estimated value calculation section that calculates a propagation path estimated value using a known signal contained in an OFDM signal, a propagation path distortion compensation section that compensates propagation path distortion for the information signal obtained from the OFDM signal using the propagation path estimated value above, an error correction section that performs error correction processing on the information signal with propagation path distortion compensated, a re-coding section that performs re-coding processing on the error-corrected signal, and the estimated value calculation section calculates a propagation path estimated value using the re-coded information signal instead of the known signal.

This configuration allows the propagation path estimated value to be calculated using the re-coded information signal instead of the known signal, making it possible to estimate propagation path response without inserting a pilot symbol between continuously transmitted information OFDM symbols even if long information is sent, thus obtaining an excellent reception characteristic without reducing the transmission efficiency.

The OFDM communication apparatus of the present invention comprises an estimated value calculation section that obtains a propagation path estimated value using a known signal contained in an OFDM signal, a propagation path distortion compensation section that compensates propagation path distortion for the information signal obtained from the OFDM signal using the propagation path estimated value above, an error correction section that performs error correction processing on the information signal with propagation path distortion compensated, a re-coding section that performs re-coding processing on the error-corrected signal, and the estimated value calculation section calculates a propagation path estimated value using a difference between the re-coded information signal and the information signal subjected to propagation path distortion compensation.

This configuration allows propagation path response to be estimated without inserting a pilot symbol between continuously transmitted information OFDM symbols, making it possible to obtain an excellent reception characteristic without reducing the transmission efficiency. Moreover, even if there is a residual phase error, this embodiment only corrects the difference while compensating the residual phase error, making it possible to reduce deterioration of the estimation accuracy due to the residual phase error.

In the OFDM communication apparatus of the present invention with the above configuration, the estimated value calculation section calculates a new propagation path estimated value using a propagation path estimated value obtained from the current re-coded information signal and a past information signal.

The OFDM communication apparatus of the present invention with the above configuration comprises a weighting section that performs weighting on the current re-coded information signal and the past information signal.

These configurations obtain a new propagation path estimated value also using a past propagation path response estimated value, and therefore using this propagation path estimated value can achieve high estimation accuracy and perform propagation path distortion compensation for information bits more accurately.

In the OFDM communication apparatus of the present invention with the above configuration, the weighting section performs weighting based on external quality information.

This configuration applies the external quality information to selection of weighting factors, and therefore can reduce estimation errors due to bit errors, improving estimation accuracy drastically.

In the OFDM communication apparatus of the present invention with the above configuration, the estimated value calculation section comprises an averaging section that averages re-coded information signals of a plurality of symbols.

According to this configuration, newly obtained propagation path estimated values corresponding to a plurality of symbols are averaged, making it possible to reduce estimation errors due to additive noise and using this propagation path estimated value makes it possible to obtain high estimation accuracy and perform propagation path distortion compensation for information bits more accurately.

The communication terminal apparatus of the present invention is characterized in that it comprises the OFDM communication apparatus with the above configuration. Furthermore, the base station apparatus of the present invention is characterized in that it comprises the OFDM communication apparatus with the above configuration.

According to these configurations, it is possible to estimate propagation path response even if long information is transmitted without inserting a pilot symbol between continuously transmitted information OFDM symbols and implement a radio communication system capable of obtaining an excellent reception characteristic without reducing the transmission efficiency.

The propagation path estimation method of the present invention comprises an estimated value calculation step of calculating a propagation path estimated value using a known signal included in an OFDM signal, a propagation path distortion compensation step of compensating propagation path distortion for the information signal obtained from the OFDM signal using the propagation path estimated value, an error correction step of performing error correction processing on the information signal with propagation path distortion compensated, a re-coding step of performing re-coding processing on the error-corrected signal, and in the estimated value calculation step, a propagation path estimated value is calculated using the re-coded information signal instead of the known signal.

According to this method, a propagation path estimated value is calculated using the re-coded information signal instead of the known signal, and therefore it is possible to estimate propagation path response even if long information is transmitted without inserting a pilot symbol between continuously transmitted information OFDM symbols and obtain an excellent reception characteristic without reducing the transmission efficiency.

The propagation path estimation method of the present invention comprises an estimated value calculation step of calculating a propagation path estimated value using a known signal included in an OFDM signal, a propagation path distortion compensation step of compensating propagation path distortion for the information signal obtained from the OFDM signal using the propagation path estimated value, an error correction step of performing error correction processing on the information signal with propagation path distortion compensated, a re-coding step of performing re-coding processing on the error-corrected signal, and in the estimated value calculation step a propagation path estimated value is calculated using a difference between the re-coded information signal and information signal with propagation path distortion compensated.

This method allows propagation path response to be estimated without inserting a pilot symbol between continuously transmitted information OFDM symbols, making it possible to obtain an excellent reception characteristic without reducing the transmission efficiency. Moreover, even if there is a residual phase error, this embodiment only corrects the difference while compensating the residual phase error, making it possible to reduce deterioration of the estimation accuracy due to the residual phase error.

As described above, the OFDM communication apparatus of the present invention adaptively estimates propagation path response using an error-corrected signal, that is, using a judged value of the received information signal, and therefore can adaptively follow up time variations of the transmission path and maintain a low error rate without reducing the transmission efficiency even when long information is transmitted or there are considerable time variations in propagation path response.

The present invention is not limited to the above described embodiments, and various variations and modifications may be possible without departing from the scope of the present invention.

This application is based on the Japanese Patent Application No. HEI 11-245098 filed on Aug. 31, 1999, entire content of which is expressly incorporated by reference herein.

What is claimed is:

1. An OFDM communication apparatus comprising:
a receiver that receives an OFDM signal in which a known signal and an information signal following said known signal are superimposed upon a plurality of subcarriers;
a calculator that calculates a propagation path estimated value using (i) the known signal and the received version of the known signal or (ii) the received information signal and a recoded signal;

a propagation path distortion compensator that compensates the propagation path distortion of the received information signal, using the propagation path estimated value, to produce a distortion compensated signal;
an error corrector that error corrects the distortion compensated signal to produce an error corrected signal; and
a recoder that recodes the error corrected signal to produce the recoded signal, wherein:
the calculator comprises:
a correction value calculator that calculates a correction value for updating the propagation path estimated value using the recoded signal and the received information signal;
a weighter that multiplies the correction value and an old propagation path estimated value, calculated earlier, with a weighting factor on a per subcarrier basis; and
an adder that adds the weighted old propagation path estimated value and the weighted correction value to produce the updated propagation path estimated value.

2. The OFDM communication apparatus according to claim 1, wherein the correction value calculator calculates a difference value between the recoded signal and the distortion compensated signal to produce the correction value.

3. The OFDM communication apparatus according to claim 1, wherein the weighting factor is based on external quality information.

4. The OFDM communication apparatus according to claim 1, wherein the calculator further comprises an averager that determines an average value of preliminarily determined correction values, calculated by the correction value calculator over a predetermined period, to produce the correction value.

5. An OFDM communication apparatus comprising:
a receiver that receives an OFDM signal in which a known signal and an information signal following said known signal are superimposed upon a plurality of subcarriers;
a calculator that calculates a propagation path estimated value using the known signal and the received version of the known signal;
a propagation path distortion compensator that compensates the propagation path distortion of the received information signal, using the propagation path estimated value, to produce a distortion compensated signal;
an error corrector that error corrects the distortion compensated signal to produce an error corrected signal; and
a recoder that recodes the error corrected signal to produce a recoded signal, wherein:
the calculator comprises:
a correction value calculator that calculates a correction value for updating the propagation path estimated value using the recoded signal and the received information signal in place of said known signal and said received version of said known signal;
a weighter that multiplies the correction value and an old propagation path estimated value, calculated earlier, with a weighting factor on a per subcarrier basis; and
an adder that adds the weighted old propagation path estimated value and the weighted correction value to produce the updated propagation path estimated value.

6. An OFDM communication apparatus comprising:
a receiver that receives a signal including a known signal and an information signal following said known signal;
a calculator that calculates a propagation path estimated value using the received known signal or the information signal;
a propagation path distortion compensator that compensates the propagation path distortion of the received information signal, using the propagation path estimated value, to produce a distortion compensated signal;
an error corrector that error corrects the distortion compensated signal to produce an error corrected signal;
a recoder that recodes the error corrected signal to produce a recoded signal; and
a subtracter that subtracts the distortion compensated signal and the recoded signal to determine a difference value, wherein:
the calculator performs an addition with the difference value and an old propagation path estimated value, calculated earlier, to update the propagation path estimated value.

7. A propagation path estimation method comprising the steps of:
receiving an OFDM signal in which a known signal and an information signal following said known signal are superimposed upon a plurality of subcarriers;
calculating a first propagation path estimated value using the received known signal;
compensating the propagation path distortion of the received information signal, using the first propagation path estimated value, to produce a distortion compensated signal;
error correcting the distortion compensated signal to produce an error corrected signal;
recoding the error corrected signal to produce a recoded signal;
calculating a correction value, for updating the first propagation path estimated value, using the recoded signal and the received information signal;
multiplying the correction value and the first propagation path estimated value with a weighting factor on a per subcarrier basis; and
adding the weighted propagation path estimated value and the weighted correction value to calculate a second propagation path estimated value.

8. An OFDM communication method comprising the steps of:
receiving a signal including a known signal and an information signal following said known signal;
calculating a first propagation path estimated value using the received known signal;
compensating the propagation path distortion of the received information signal, using the first propagation path estimated value, to produce a distortion compensated signal;
error correcting the distortion compensated signal to produce an error corrected signal;
recoding the error corrected signal to produce a recoded signal;
subtracting the distortion compensated signal and the recoded signal to determine a difference value; and
adding the first propagation path estimated value and the difference value to determine a second propagation path estimated value.

* * * * *